US007757941B2

(12) United States Patent
Brodin

(10) Patent No.: US 7,757,941 B2
(45) Date of Patent: Jul. 20, 2010

(54) METHOD AT THE PRODUCTION OF AN IDENTITY CARD OR SIMILAR, AND AN ARRANGEMENT AT THE PRODUCTION OF SUCH A CARD

(75) Inventor: Peter Brodin, Danderyd (SE)

(73) Assignee: Speed Identity AB, Tyreso (SE)

( * ) Notice: Subject to any disclaimer, the term of this patent is extended or adjusted under 35 U.S.C. 154(b) by 1155 days.

(21) Appl. No.: 10/534,834

(22) PCT Filed: Nov. 13, 2003

(86) PCT No.: PCT/SE03/01762

§ 371 (c)(1),
(2), (4) Date: Oct. 25, 2005

(87) PCT Pub. No.: WO2004/044836

PCT Pub. Date: May 27, 2004

(65) Prior Publication Data

US 2006/0131388 A1 Jun. 22, 2006

(30) Foreign Application Priority Data

Nov. 13, 2002 (SE) .................................... 0203352

(51) Int. Cl.
*G06K 5/00* (2006.01)

(52) U.S. Cl. ....................................... 235/380; 235/382

(58) Field of Classification Search ................. 235/382, 235/382.5, 375, 380
See application file for complete search history.

(56) References Cited

U.S. PATENT DOCUMENTS

| | | | |
|---|---|---|---|
| 5,886,334 A | 3/1999 | D'Entremont et al. | |
| 5,913,542 A | 6/1999 | Belucci et al. | |
| 6,325,285 B1 | 12/2001 | Baratelli | |
| 6,354,494 B1 * | 3/2002 | Marcus ....................... | 235/380 |

FOREIGN PATENT DOCUMENTS

| | | |
|---|---|---|
| GB | 2 054 178 | 2/1981 |
| WO | WO 01/41041 | 6/2001 |

OTHER PUBLICATIONS

Patent Abstract of Japan vol. 2000, No. 9, Oct. 13, 2000 & JP 2000163531 A (Ryo Meishin), Jun. 16, 2000 abstract.

* cited by examiner

*Primary Examiner*—Karl D. Frech
(74) *Attorney, Agent, or Firm*—Young & Thompson

(57) ABSTRACT

The present invention relates to a method and to an arrangement for producing an ID document (9) or a like document in which a photograph (2) shall be included in the ID-document and in which the photograph (2) is produced in a digital form and transferred (7) for direct copying into the document (9) while still in its digital form. According to the invention additional information concerning an owner of the ID document (9) is produced in a digital form and transferred for incorporation in the ID document (9) in an electronic form (13).

18 Claims, 1 Drawing Sheet

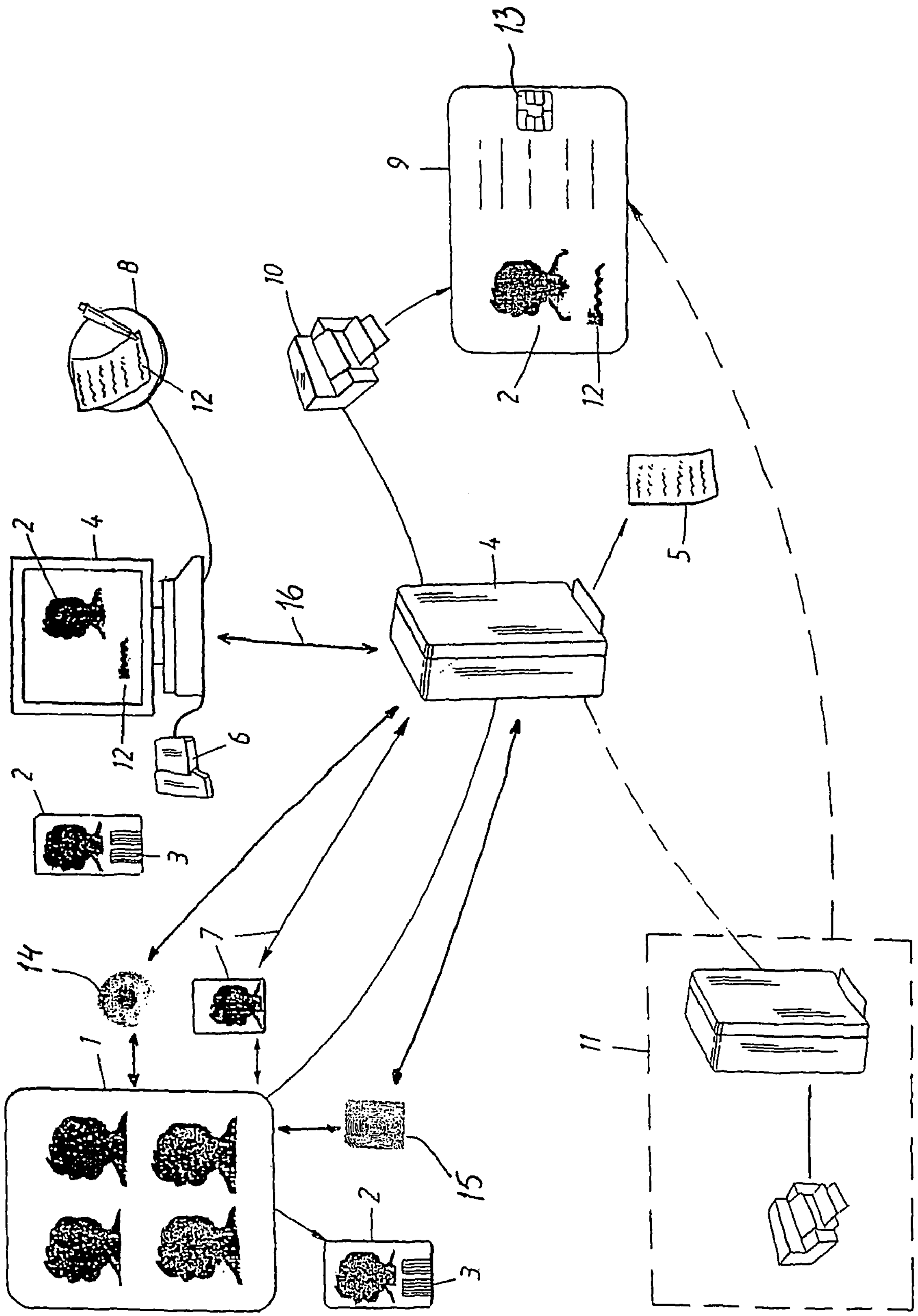
13
9
8
10
12
2
12
2
4
16
4
5
2
12
6
2
3
14
7
1
11
15
2
3

METHOD AT THE PRODUCTION OF AN IDENTITY CARD OR SIMILAR, AND AN ARRANGEMENT AT THE PRODUCTION OF SUCH A CARD

BACKGROUND OF THE INVENTION

1. Field of the Invention

The present invention relates to a method of producing identification documents or the like, and then particularly documents of the kind that shall include a photograph and in which other data shall be stored electronically.

The invention also relates to an arrangement which is adapted to specifically for the production of such items and data to be used in the production of identification documents and the like, particularly in respect of the use of the inventive method.

2. Description of the Related Art

WO 01/41041 A1 discloses a method of producing an ID document, or the like, which shall include a photograph, wherein the photograph is produced in a digital form, and wherein the photograph is transmitted for direct copying in the ID document whilst still in its digital form. This prior publication also discloses the seizure of a signature with the aid of a so-called signature pad, and to digitally transmit the signature for copying into the ID document.

More stringent desiderata have been expressed in recent times, requiring the possibility of also storing in such ID documents additional information concerning the person to which the document relates, for example the storage of an image of one iris of said person, the storage of fingerprints, and also the storage of other biometric data relating to said person electronically on the ID document.

BRIEF SUMMARY OF THE INVENTION

Accordingly, one object of the present invention is to provide a method which will enable such an ID document to be readily produced, while a further object of the invention is to provide an arrangement with which such a document can be produced.

The first object of the invention is achieved by producing additional information relating to an owner of the ID document in digital form and transferring this additional information to the document production site for incorporation in said document electronically.

The other object of the invention is achieved by including in the arrangement means for capturing further information relating to an owner of the ID document and producing this further information in digital form and transferring the same to the document production site for incorporation in said document electronically.

BRIEF DESCRIPTION OF THE DRAWING FIGURE

The drawing FIGURE illustrates the production of an identification card according to a preferred embodiment of the present invention.

DETAILED DESCRIPTION OF THE PREFERRED EMBODIMENTS

The invention will now be described in more detail with reference to a non-limiting embodiment illustrated with the aid of an elementary diagram which illustrates schematically a possible formulation of a method of producing an ID document in accordance with the invention, wherein only those parts essential to the present invention have been shown. There will first be described the earlier principles of producing an ID document known from the aforesaid published patent application.

Shown schematically in the drawing is a photo booth 1 which, in accordance with the invention, is equipped with a digital camera with which digital pictures can be taken of the person desiring a photograph for the production of an identification document. The photo booth 1 may be provided conventionally with a pointer screen on which desired adjustments can be made. Instructions as to how the photograph shall be produced are shown on the screen, possibly supplemented with voice instructions and possibly also in various selective languages.

It is not essentially that the photo both is equipped with a digital camera, as other types of camera may alternatively be used in the present case, for instance a conventional video camera whose pictures are then converted to a photograph that is stored in digital form by means of equipment installed in the photo booth, such as a computer, for instance. It is, however, suitable for the booth to be equipped with a digital camera so that a sufficiently high picture element density can be obtained in the captured picture.

The camera provided in the photo booth 1 is connected to a network-connected computer in which the photographs are stored digitally, and may also be connected to a printer that can print out the chosen photographs 2. Storage of the photographs requires the photographs to be provided with an identification 3, which may be provided by the computer through a random selection program or as a serial number or, alternatively, identification entered by the user himself/herself, for instance his/her social security number. The means of identification under which the photographs are stored in the computer may also be printed on the photograph 2 or on the photographs printed out by the printer installed in the booth, preferably in a machine-readable form, for instance in the form of a bar code 3 when the photograph/photographs is/are printed out.

A photo booth of the aforedescribed kind may, for instance, be established in connection with the authorities or companies that are able to prepare the identification documents 9 concerned, although this is not really necessary since the distance between the photo booth and the issuer of the document has no real importance.

A photo booth according to the aforegoing may also be equipped conveniently with software with which a detailed view of the iris of said person can be produced automatically from the portrait photograph taken, so as to create an iris image, and/or to produce a facial recognition image automatically from the portrait photograph taken.

In the process of obtaining an identification document 9, the person whose photograph 2 has been taken in a photo booth as described above, goes to the authority or company that issues identification documents of the kind desired and hands over his/her photograph 2 carrying the printed/written identification means 3 to the official responsible for handling the production of or the processing of applications for such identification documents. The official is then able to establish that the person presenting the new photograph is the correct person, by checking earlier identification documents in the possession of the person concerned, and that this person is thus entitled to have the identification document 9 issued. The official also has access, via a computer 4, to the computer program or programs required to produce the requested identification document. Information relating to the person concerned may have been stored in a database to which the official has access, thereby enabling this personal data or information to be taken from the computer and readily entered on an application form 5 applicable to the requested identification document 9. The official may also include the identification means 3 given on the photograph. When the identification means has the form of a bar code 3, this information can be read in with the aid of a bar code reader 6, for instance. However, it is not necessary to print out a photograph or some form of identification, since the person applying for the identification document 9 may simply give the official the identification under which the photograph has been saved for instance her/her social security number.

When the photo booth is equipped with software for creating a facial recognition image automatically, a camera for a facial recognition system may be arranged in the proximity of the document processing station so that when a person who has taken a photograph in an associated photo booth stands before an official the facial recognition system is activated and the official obtains on his/her monitor (or data screen) those pictures that have been taken in the photo booth, and the person requesting the identification document then proves his/her identity with the aid of an existing identification document, so that the official is able to take from his computer 4 the remaining personal information required for issuing the identity document. It is not necessary to print out the photographs taken in the photo booth in this particular case.

Alternatively, verification of a stored facial recognition image can be achieved with the aid of a camera which is mounted in the proximity of the document processing station and which is connected to one or more computers that include one or more facial recognition programs used in practice, where the stored facial recognition image can be compared with the results given by the program or programs. This enables the input data that shall form the basis for the production of an ID document to be verified before being forwarded for incorporation in said document.

It may also be appropriate to provide at the document processing station a camera for iris recognition, with which it can be checked that the iris image that has been taken functions in practice. This also enables the input data relating to the iris image that shall form the basis of the production of an ID document to be verified before forwarding said input data for incorporation in the ID document.

Regardless of whether the ID document 9 shall be produced directly at the place 10 where the application is made, or at a separate location 11, the photo identification, and also possibly said iris image and facial recognition image, can be fetched at 7 digitally for incorporation in the ID document 9 with the aid of a suitable technique.

If the ID document 9 shall also bear the owner's signature 12, the method may also include a signature pad 8 on which the signature 12 can be written and transferred digitally to the ID document 9 and copied thereon. The thus created digital signature may also be saved in the same database as the digital photograph and in which the iris image and the facial recognition image may also be saved, suitably together with the identification given to the digital photograph. Alternatively, the digital signature may be saved in another database from which the signature 12 can be fetched in connection with the production of the ID document 9.

In many instances, it is required that a basic application form is stored as proof that the identification document has been prepared correctly. This basic form may then include an original photograph 2 and the original signature of the document owner. The basic form may suitably be the application form 5 prepared by the official with the aid of the data program to which he/she has access and to which the personal data relating to the person requesting the identification document can be fetched from relative databases. The form 5 can then be printed out and given to the person to whom the identification document shall be issued, who will then place the form on the signature pad 8 and write an original signature 12 on the form, said signature being transferred digitally to the database in which the data for the production of the ID document is stored.

In the production of the identification document 9, which can take place directly at the place 10 where the application is made, as before mentioned, or at a central location 11 to which the basic application form 5 has been sent, the requisite data/information is entered into or taken from a database and written into or copied into the document that is to form the basis of the ID document, together with the images of the photograph 2 and the signature 12 fetched from one or more databases. The basis for the ID document may consist of paper, plastic material or corresponding material, that is typical in respect of this type of document, and the inputting or copying of data may be effected in any suitable and appropriate manner with respect to the document concerned.

With regard to identification cards or documents that are produced in a central location, it will be understood that it is not necessary for all information, e.g. the digital copy of the photograph and/or of the signature, to be fetched directly on line by the official producing the document, and that this data may, of course, be stored on other data storage media, such as diskettes, compact disks, tapes or equivalent data carriers, which are sent from the place at which the request is tendered to the company responsible for the actual production of the identification document.

As will be understood, in respect of the production of an ID document 9 there may be included in the document further information in accordance with the invention additional to the aforesaid information in ordinary readable form, this additional information being stored electronically on the ID document at 13. For example, the ID document may be provided with a magnetic strip or a microchip for the storage of information, for instance a so-called smart card, 13.

The additional information with which this type of ID documents are at present supplemented is so-called biometric information concerning the owner of the ID document. This additional information may, for instance, consist of iris identification 14, fingerprint identification 15, palm print identification or facial recognition data.

As earlier mentioned, this additional data may conveniently be captured in conjunction with the person concerned taking his/her photograph 2 and/or signing his/her signature 12 in accordance with the aforegoing, and may then be sent to the document production site 11 or console together with the remaining data sent in digital form for the production of the ID document, and there stored electronically in the ID document 9 at 13, for instance on a magnetic strip or in a so-called smart card 13.

An iris identification 14 may be effected with the aid of a separate image of the person's iris, wherewith the image 14 is taken in a photo booth 1 in conjunction with taking a photograph 2. The image 14 of an iris can conceivably be achieved by taking a significantly enlarged digital photograph of the person's iris in a separate sequence, wherein focusing may, for instance, be achieved with the aid of instructions presented on the screen in the photo booth and instructing the person to centre one iris in a marked area, which is then photographed. Alternatively, a separate image of the iris may be obtained in a separate iris photographing lens mounted in the photo booth 1. Such a lens may, for instance, be arranged in a manner corresponding to the eyepiece of a microscope where the person concerned is instructed to sit with one eye against the eyepiece for the purpose of taking the image 14. As before mentioned, the most suitable method of imaging the person's iris is to produce said image from the photograph 2 taken in the photo booth 1, with the aid of software. This prevents the possibility of manipulation between the photograph and the iris image.

An image 14 of the iris can then be stored as a digital photograph electronically at 13 in the ID document 9, wherewith this photograph can be sent directly in a digital form from the photo booth 1 to the place 11 at which the ID document is produced. This enables the electronically stored image of the person's iris to be taken from the ID document 9 at a later stage and compared with the person presenting the ID document.

If the additional information to be saved relates to facial recognition, the connection with the photographing procedure in the photo both 1 is suitably applied, as before mentioned, and the digital photograph taken is processed by means of software so that an identification of the person on the photograph 2 can be saved electronically. As before mentioned, processing of the digital photograph to form said facial recognition may be suitably effected directly in the photo booth 1 and the result then sent electronically to the place 11 in which the ID document 9 is produced and there incorporated electronically at 13 in said document. Alternatively, processing of the digital photograph can be effected at the place 11 at which the ID document is produced.

The photo booth may conveniently include a scanning system which monitors continuously the facial recognition and iris imaging processes and controls the imaging moment to a state at which the conditions under which facial recognition and iris imaging pictures of sufficient quality for use to this end are fulfilled.

When the additional information shall relate to fingerprint identification 15 or palm print identification, there are available methods which enable the identification of a person to be created directly by registering a finger or a hand placed on a detection pad by virtue of detecting the lines on a finger or on a hand and registering said lines, wherewith given points are identified and stored to constitute an identification of the person concerned. Such registration of fingerprints or palm prints can thus be made in conjunction with fetching further information for an ID document and sending said prints in digital form to the place at which the ID document is produced, for storage electronically at 13 in the document 9 to be produced. This registration of a fingerprint or palm print 15 is suitably effected in connection with the person writing his/her signature 12 on the aforedescribed signature pad 8, so that an official is able to see that the person giving his/her fingerprint or palm print 15 is the correct person, and also to see that the pad used to this end has been cleaned from earlier given prints.

The arrangement used at the place where the ID document is produced may include the possibility of said person giving a new fingerprint after a fingerprint has been taken, this new fingerprint being checked by software and compared with the fingerprint that has already been saved, this enables the input data concerning the fingerprint that shall form the basis on which the ID document is produced to be verified before said data is forwarded for incorporation in the ID document.

It will be obvious that the principle of the invention can also be applied with other types of identification of a person than those described above. For example, if the identification shall consist of voice recognition, the voice profile of a person is made and stored electronically in the ID document.

In order to be able to construct a secure system, it is necessary that no unauthorised person is able to enter data into the ID document production system. It is, therefore, necessary that the official that handles the issue of ID documents in the authorised authority or company has been authorised to handle such cases in the system. This authorisation is suitably entered into the system and the official accepted to carry out certain services when logging into the system. It is also suitable for the identification of the official 16 to be stored in the ID documents produced subsequent to the acceptance of the official concerned, this identification of the official being effected when the official logs into the system. These identification data can also be stored electronically at 13 in the ID document 9, meaning that any misuse can be traced back to the official concerned.

It has been stated above that the signature pad 8 on which the person requesting an ID document has written his/her signature 12, and also the registration 15 of a fingerprint or palm print take place in connection with said person meeting said official. However, the signature pad 8 and the means for registering the fingerprint or palm print 15 may be provided in the photo booth 1, so that the person concerned may give all of the data or information to be entered into the ID document in the booth 1 itself. However, the official will preferably be able to monitor the person present in the photo booth in such a case, when only one person is present in the booth. This can be achieved in different ways. For instance, the photo booth may be monitored by a camera so as to enable the official to see the person present in the photo booth on his computer screen 4, and possibly also to assist the person in respect of the instructions given and to answer any questions that may be asked.

It will be understood that the inventive system can be applied on all types of identification documents or pass cards and is not restricted to the production of ID documents that require the highest security. For example, the invention can be applied in a system in which identity cards are produced on site, for instance company internal ID cards and pass cards. In the case of ID documents of the highest security class, such as national identification cards, driving licenses and passports, the invention provides the significant advantage of enabling all information on which the production of the ID document is based to be readily obtained in a manner that will obviate the risk of the acuity and the correctness of the information being impaired as a result of handling mistakes in the production chain.

As a result of effecting facial recognition and iris imaging with the aid of software from a photograph in accordance with one part of the invention, it is guaranteed that all said data originates from one and the same person.

The invention claimed is:

1. A method of producing an ID document (9) or a like document in which a photograph (2) is produced in a digital form and transferred (7) for direct copying into the document (9) while still in its digital form, comprising:

producing in digital form additional information concerning an owner of the ID document (9) in the form of a facial recognition image that is created by software;

by computer processing the photograph produced in digital form; and transferring said additional information for incorporation in the ID document (9) in an electronic form (13).

2. The method according to claim 1, wherein additional information in the form of imaging (14) of the owner's iris is also produced in digital form, said imaging (14) being effected at the same place as the photograph (2) is produced, and transferring said additional information for incorporation in the ID document (9) in an electronic form (13).

3. The method according to claim 2, wherein the iris image (14) is created by software, by computer processing the photograph produced in digital form.

4. The method according to claim 1, wherein additional information in the form of information relating to the owner's fingerprint (15) is also produced digitally in connection with said owner also writing his signature (12), and transferring said additional information for incorporation in the ID document (9) in an electronic form (13).

5. The method according to claim 1, wherein the ID document is produced subsequent to the acceptance of a document issuing official; and in that identification information (16) concerning said official is also stored on the ID document (9) in an electronic form (13), together with said additional information.

6. The method according to claim 1, wherein the additional information is stored in a smart card (13) on the ID document (9).

7. The method according to claim 1, wherein the photograph (2) produced in digital form and also said additional information is sent to a central location at a different place for the production of the ID document (9) at a secure document production site.

8. The method according to claim 1, wherein the method produces biometric information.

9. The method according to claim 8, wherein the biometric information is iris identification, palm print identification or facial recognition data.

10. An arrangement for producing an ID document (9) or a like document, where a photograph (2) shall be included in the ID document and where the photograph (2) is produced in a photo booth (1) in digital form and transferred for direct copying into the ID document with the photograph still in a digital form, comprising:

means for capturing additional information in the form of a facial recognition image relating to an owner of the ID document, for incorporation in the ID document (9) as additional information in electronic form (13), said additional information (14, 15) being produced in a digital form and transferred for incorporation in an electronic form (13) in the ID document (9).

11. The arrangement according to claim 10, wherein the photo booth (1) also includes equipment for taking a picture of the iris (14) of the person being photographed, said picture (14) of the iris being processed and the resultant iris image being incorporated in the ID document (9) in an electronic form (13) as additional information.

12. The arrangement according claim 11, wherein equipment provided in the photo booth (1) is adapted to take a separate picture of the iris (14) of the person being photographed.

13. The arrangement according to claim 11, wherein the equipment provided in the photo booth (1) comprises software designed to automatically make a detailed view of the iris (14) of the person taken from a photograph taken of said person.

14. The arrangement according to claim 10, wherein the arrangement also includes a fingerprint reader which registers the fingerprint (15) of said person and which is connected to means for processing said fingerprint (15), wherewith the result is incorporated on the ID document (9) as additional information in an electronic form.

15. The arrangement according to claim 10, wherein the photograph (2) produced in digital form and also the additional information (14, 15) are transferred to a central location (11) at another place for production of the ID document (9) at a secure and safe production site (11).

16. The arrangement according to claim 10, wherein the arrangement produces biometric information.

17. The arrangement according to claim 16, wherein the biometric information is iris identification, palm print identification or facial recognition data.

18. A method of producing an ID document (9) or a like document in which a photograph (2) is produced directly in a digital form and transferred (7) for direct copying into the document (9) while still in its digital form, comprising:

producing directly in digital form additional information concerning an owner of the ID document (9) in the form of a facial recognition image that is created by software;

by computer processing the photograph produced directly in digital form; and transferring said additional information for incorporation in the ID document (9) in an electronic form (13).

* * * * *